(12) United States Patent
Nocera

(10) Patent No.: US 8,650,613 B2
(45) Date of Patent: Feb. 11, 2014

(54) SIMPLIFIED PAIRING FOR WIRELESS DEVICES

(75) Inventor: Bastien R. D. Nocera, Guildford (GB)

(73) Assignee: Red Hat, Inc., Raleigh, NC (US)

(*) Notice: Subject to any disclaimer, the term of this patent is extended or adjusted under 35 U.S.C. 154(b) by 669 days.

(21) Appl. No.: 12/619,877

(22) Filed: Nov. 17, 2009

(65) Prior Publication Data

US 2011/0119491 A1    May 19, 2011

(51) Int. Cl.
*H04L 29/06* (2006.01)

(52) U.S. Cl.
USPC ........ 726/3; 726/2; 726/27; 726/29; 713/169; 380/270; 455/41.1; 455/41.2

(58) Field of Classification Search
USPC .............. 726/2, 3, 27, 29; 713/169; 380/270; 709/237; 455/41.1, 41.2
See application file for complete search history.

(56) References Cited

U.S. PATENT DOCUMENTS

| | | | | |
|---|---|---|---|---|
| 7,216,231 | B2* | 5/2007 | Gehrmann | 713/171 |
| 7,860,456 | B2* | 12/2010 | Kim | 455/41.2 |
| 8,291,405 | B2* | 10/2012 | Buckley et al. | 717/170 |
| 8,442,977 | B2* | 5/2013 | McCloskey et al. | 707/728 |
| 2005/0048961 | A1* | 3/2005 | Ribaudo et al. | 455/419 |
| 2006/0135065 | A1* | 6/2006 | Lee et al. | 455/41.1 |
| 2006/0173838 | A1* | 8/2006 | Garg et al. | 707/5 |
| 2006/0251256 | A1* | 11/2006 | Asokan et al. | 380/270 |
| 2006/0270350 | A1* | 11/2006 | Kim | 455/41.2 |
| 2008/0274696 | A1* | 11/2008 | Bakshi et al. | 455/41.2 |
| 2009/0017755 | A1* | 1/2009 | Tomoda | 455/41.2 |
| 2009/0207014 | A1* | 8/2009 | Ayed | 340/539.13 |
| 2010/0093319 | A1* | 4/2010 | Sherman | 455/414.1 |
| 2011/0063103 | A1* | 3/2011 | Lee et al. | 340/505 |
| 2011/0183613 | A1* | 7/2011 | Nocera | 455/41.2 |
| 2012/0254085 | A1* | 10/2012 | Maruyama et al. | 706/20 |
| 2013/0207779 | A1* | 8/2013 | Uno et al. | 340/5.82 |

OTHER PUBLICATIONS

"Connecting Your Devices", Bluetooth.com/Generic Pairing Instructions, Printed from Internet on Feb. 16, 2010, 2 pages.

* cited by examiner

*Primary Examiner* — Nathan Flynn
*Assistant Examiner* — Sarah Su
(74) *Attorney, Agent, or Firm* — Lowenstein Sandler LLP

(57) ABSTRACT

A first wireless device is paired with a second wireless device for communication over a wireless connection. The first wireless device receives an input that indicates a device identifier of the second wireless device, and then matches the device identifier with one of the data entries in a data repository to obtain a code of the second wireless device without user interactions. The data repository contains a plurality of data entries associating a plurality of wireless devices with their corresponding codes. Based on the code of the second wireless device, the first wireless device authenticates the second wireless device and establishes the wireless connection.

20 Claims, 5 Drawing Sheets

US 8,650,613 B2

SIMPLIFIED PAIRING FOR WIRELESS DEVICES

TECHNICAL FIELD

Embodiments of the present invention relate to communications between two wireless devices, and more specifically, to the determination of a code of a wireless device when establishing a connection to another wireless device.

BACKGROUND

Many wireless electronic devices are capable of exchanging data over a short range distance (e.g., a few to a hundred meters) using wireless data communication protocols. One of such protocols in common use today is Bluetooth. Many of the services offered over Bluetooth can expose private data, or allow a connecting device to control another device. For example, a Bluetooth-enabled headset can be connected to a mobile phone and receive the audio signals destined for the phone. A Bluetooth-enabled mouse can be connected to a computer and control the cursor movement on the computer. For security reasons, it is generally necessary to control the devices that are allowed to gain access to a given Bluetooth device. Therefore, a conventional Bluetooth device generally has a pre-determined personal identification number (PIN) code that can be used for authentication purposes.

The Bluetooth protocol defines a pairing process, which determines whether two Bluetooth-enabled devices (also referred to "Bluetooth devices") can be authenticated to wirelessly communicate with each other. To pair two Bluetooth devices that do not have the "Secure Simple Pairing" (SSP) feature (which is available in Bluetooth 2.1 or later versions), a user typically has to manually enter PIN codes on both devices. A device that does not have a keypad or other means for entering the PIN code can use a pre-determined static PIN code for the pairing purposes. The PIN code is provided by the manufacturers of Bluetooth devices and is usually documented in the user manual. The PIN code can be used to compute an encryption key, which encrypts the wireless link between two Bluetooth devices to prevent man-in-the-middle attacks.

Conventionally, when a user wishes to pair two Bluetooth devices, the user typically has to manually enter at least one PIN code of one of the devices during the pairing process. For example, if one device is a headset and the other device is a mobile phone, a user typically has to look up the PIN in the headset's user manual, and enter the PIN using a keypad on the mobile phone. Once a pairing between the two devices has been established, the pairing is remembered by the two devices. Subsequent connections between the two devices can be established without repeating the pair process unless the pairing relationship is removed by the user.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Described herein is a method and system for pairing wireless devices. In one embodiment, a first wireless device is to be paired with a second wireless device for communication over a wireless connection. The first wireless device receives an input that indicates a device identifier of the second wireless device, and then matches the device identifier with one of the data entries in a data repository to obtain a code of the second wireless device without user interactions. The data repository contains a plurality of data entries associating a plurality of wireless devices with their corresponding codes. Based on the code of the second wireless device, the first wireless device authenticates the second wireless device and establishes the wireless connection.

In one embodiment, the wireless devices are enabled to communicate using the Bluetooth protocol without the Secure Simple Pairing (SSP) support. In contrast to the conventional pairing process, an embodiment of the invention allows the wireless devices to be paired without the user manually entering or manually confirming a PIN code (also referred to as a "code"). Instead, a wireless device can automatically look up a data repository to locate a PIN code for a connecting device. Data entries in the data repository may be provided by device manufacturers and/or software providers, and can be modified by a system administrator to include information pertaining to the devices that are commonly used in a specific environment such as an organization, a company or an office.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Figure 1:
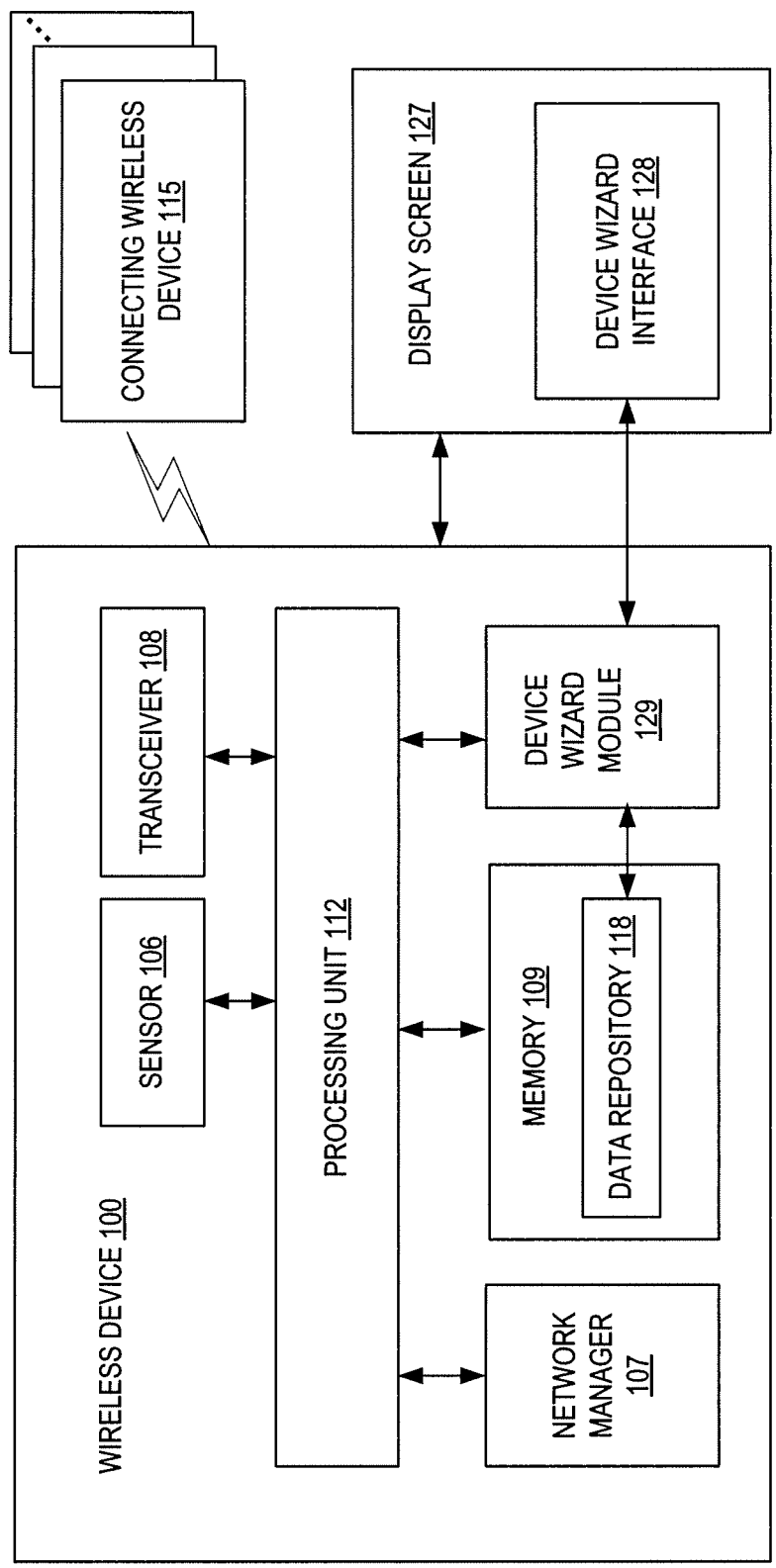
FIG. 1 is a block diagram of a wireless device which implements embodiments of the invention.

FIG. 1 illustrates an exemplary wireless device 100 which implements embodiments of the invention. The wireless device 100 may be a computer (e.g., a server, a workstation, a personal computer (PC), a laptop, etc.), a mobile phone, a hand-held computing device, a game station, a personal digital assistant (PDA), a global positioning system (GPS) device, etc. In one embodiment, the wireless device 100 supports a communication protocol for exchanging data wirelessly over a short range. An example of the communications protocol is Bluetooth, which is an industry standard for short-range wireless communications with low power consumption.

In one embodiment, the wireless device 100 may also be connected to a wired network (e.g., a local area network (LAN), the Internet, or other private or public wired network) in addition to the short-range wireless connections. The wireless device 100 may exchange data via the short-range wireless connections with one or more connecting wireless devices 115, which may be a computer, a mouse, a keyboard, a headset, a phone, a PDA, a game station, a GPS device, etc.

In one embodiment, the wireless device 100 includes processing unit 112, which may include one or more processors. The processing unit 112 executes instructions and interacts with other functional units in the wireless device 100. The wireless device 100 also includes a network manager 107 to manage wireless communications for the wireless device 100, one or more sensors 106 to detect the presence of the connecting wireless devices 115 within the vicinity of the wireless device, and a transceiver 108 to transmit and receive wireless signals from the connecting wireless devices 115. In some embodiments, the sensor 106 and the transceiver 108 may be integrated into the same piece of unit, which switches between a sensor mode and a transceiver mode at a high rate (e.g., thousands of times per second). The network manager 107 performs a pairing process with one or more of the connecting wireless devices 115 to determine which devices 115 are permitted to communicate with the wireless device 100. The pairing process may include a sequence of handshakes between the wireless device 100 and a connecting wireless device 115 to exchange authentication information.

In one embodiment, the wireless device 100 also includes a device wizard module 129, which enables a device wizard interface 128 to be shown on a display screen 127 coupled to the wireless device 100. The device wizard interface 128 includes a sequence of screen displays to guide a user through the pairing process. In an alternative embodiment, the wireless device 100 is not coupled to a display screen. Instead, the wireless device 100 has a display element integrated in its housing. For example, the display element may be a Liquid Crystal Display (LCD) with a one-line display, which allows the user to scroll through a list of devices and select one device to be paired with the wireless device 100.

Through the device wizard interface 128, the device wizard module 129 receives the device identifier of a connecting wireless device 115 that a user wishes to connect to the wireless device 100. The device wizard module 129 uses the device identifier to look up a matching data entry in a data repository 118 that contains a collection of data entries. In one embodiment, the data repository 118 may be a file (e.g., an Extensible Markup Language (XML) file) stored in a memory 109 of the wireless device 100. The memory 109 may include volatile memory devices (e.g., random access memory (RAM)), non-volatile memory devices (e.g., flash memory), and/or other types of memory devices. In an alternative embodiment, the data repository 118 may be stored in data storage (not shown) coupled to the wireless device 100. The data storage may include mass storage devices, such as magnetic or optical storage based disks, tapes or hard drives.

According to one embodiment of the present invention, the data repository 118 provides the PIN code for the connecting wireless device 115. Upon receiving an identifier of the connecting wireless device 115, the device wizard module 129 looks up a matching data entry, which contains the PIN code associated with the connecting wireless device 115. There is no user interaction for entering the PIN code. The PIN code is used to authenticate the connecting wireless device 115, and establishes a connection with the connecting wireless device 115 if the authentication is successful. After the connection is established, the wireless device 100 communicates with the connecting wireless device 115 using the transceiver 108.

Figure 2:
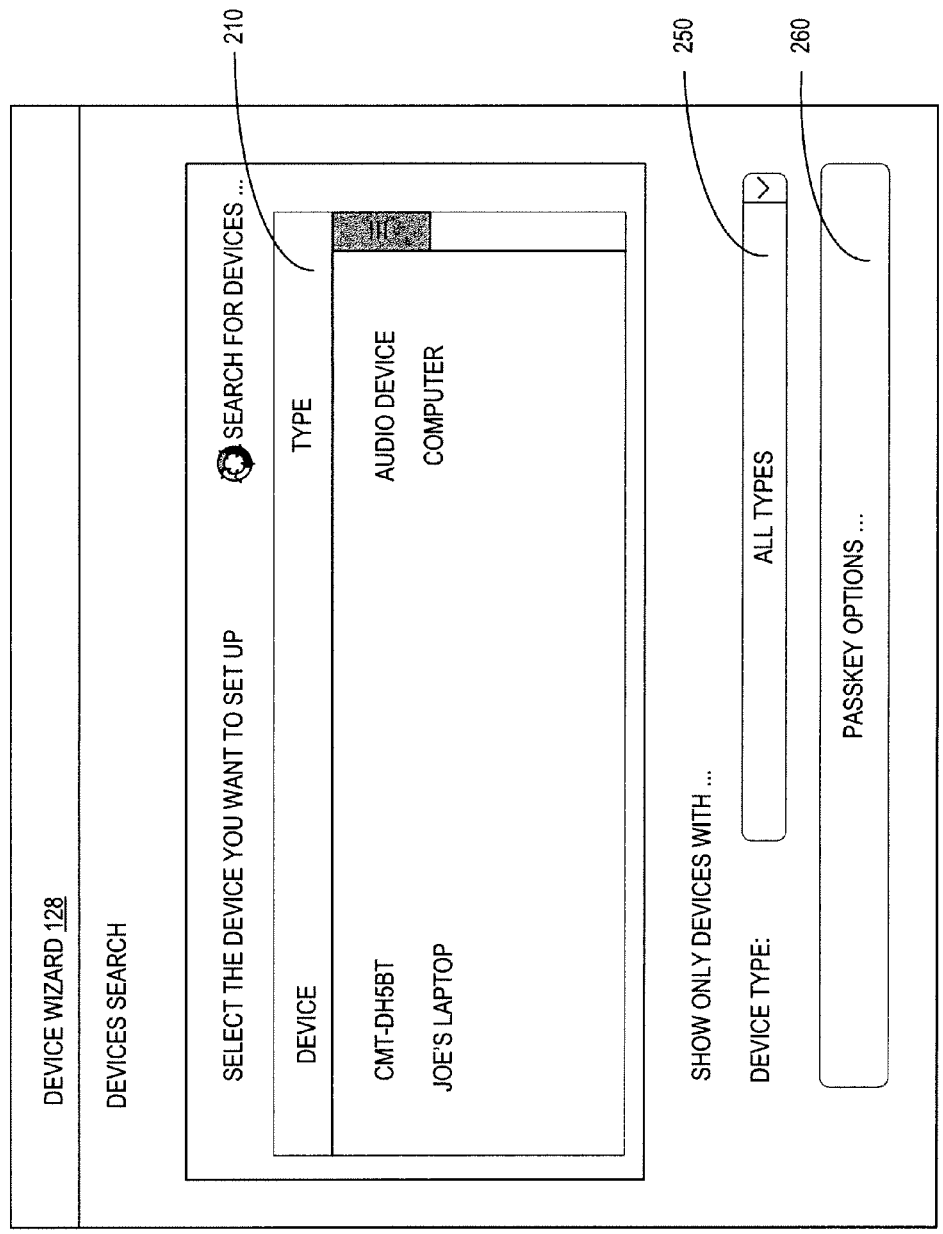
FIG. 2 is a diagram of one embodiment of a user interface displayed by the wireless device.

FIG. 2 illustrates an example of a screenshot of the device wizard 128. The device wizard 128 displays a list of devices (i.e., the connecting wireless devices 115) that have been found in the vicinity (i.e., within the wireless communication range) of the wireless device 100. The list of devices may be shown in a scrollable window 210. Each device is shown as a device name and a corresponding device type (also referred to as a "device class"). A user can select from the list a device that he wants the wireless device 100 to pair with. In one embodiment, the device wizard 128 also includes a filter function that filters the devices shown in the window. For example, when a user presses a button 250, a list of available device types will be shown in a pull-down menu. The user may select "headset" as a filter, and only the devices with device type "headset" will be shown in the window 210.

Once a device is selected from the window 210, the device wizard module 129 looks up the data repository 118 to identify a PIN code for the selected device. If a PIN code cannot be found, then the device wizard 128 will inform the user to manually enter the PIN code. In one embodiment, the user can press a "passkey options" button 260, which causes another window to pop up. The user may manually enter the PIN code into this other window. In an alternative embodiment, the network manager 107 may be implemented to incorporate the capability (e.g., PIN code lookups).

Figure 3:
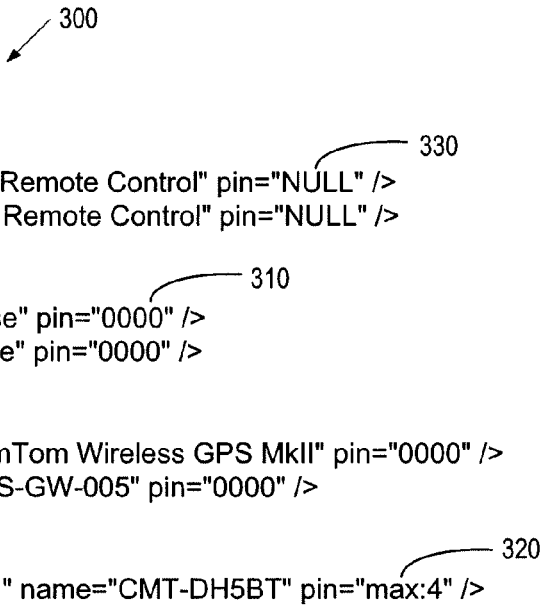
FIG. 3 illustrates one embodiment of data entries in a data repository accessible by the wireless device.

FIG. 3 illustrates an example of the data entries in the data repository 118. In this example, the data entries are stored in an XML file 300. The XML file 300 includes a collection of data entries, each including a device identifier and a corresponding code. The device identifier may include one or more of a device name, an organizationally unique identifier (OUI), and a device type. In one embodiment, the data entries in the file may be sorted in an order from specific to generic. For example, a first data entry that represents a headset of a specific brand can be listed before a second data entry that represents generic headsets. The device identifier of the first data entry may include an OUI to indicate the specific brand, and may additionally include a device name and/or a device type. The device identifier of the second data entry may include only the device type and not the OUI. The device wizard module 129 scans the XML file 300 in the direction from specific entries to the generic entries (e.g., from top to bottom), and stops scanning when a matching data entry is found. Thus, if a headset of a specific brand uses a particular PIN code that is different from the generic PIN code of generic headsets, the device wizard module 129 will locate the particular PIN code instead of the generic PIN code.

In an alternative embodiment, the data repository 118 may include multiple files with each file containing multiple data entries. The files may be provided by the vendors of the wireless devices. Data entries in the files may be unsorted. In this alternative embodiment, the device wizard module 129 may scan all of the data entries in the files and determines the best matching data entry for a selected device. The device wizard module 129 may first identify a number of candidate data entries with each candidate data entry being associated with a weighting factor. For example, a candidate data entry that matches both the OUI and the device type is weighed more heavily than another candidate data entry that only matches the device type. The device wizard module 129 then determines a matching data entry as the candidate data entry that has the most weight.

In the embodiment of FIG. 3, it is shown that some of the PIN codes are pre-determined fixed-length numbers 310 (e.g., "0000"). Some of the PIN codes are random numbers up to a maximum number of digits 320 (e.g., max: 4). Some of the PIN codes are shown as "NULL" 330, which indicates that the devices will not be paired, but will be connected without an encrypted connection and will be marked as trusted. The "NULL" 330 can be used for devices such as mice and joypads where there is no encryption.

Referring to FIG. 2 and FIG. 3, in one embodiment, the device names shown in window 210 are the same as the device names in the file 300. The device names in both places are provided by the corresponding remote devices (e.g., the connecting wireless devices 115). However, the device names may be somewhat cryptic (e.g. "CMT-DH5BT," instead of "Sony Bluetooth speakers CMT-DH5BT"). In one embodiment, for a device that was previously known and paired with the wireless device 100, an end user may change the device name in the window 210 to a name more descriptive and meaningful to that user.

For certain input devices the device wizard module 129 may implement a helper function that detects the absence of a peripheral device (e.g., an input device such as a mouse or a keyboard) on the system. When the absence of the device is detected, the helper function automatically looks for such a device in the vicinity and informs the user of this action.

Figure 4:
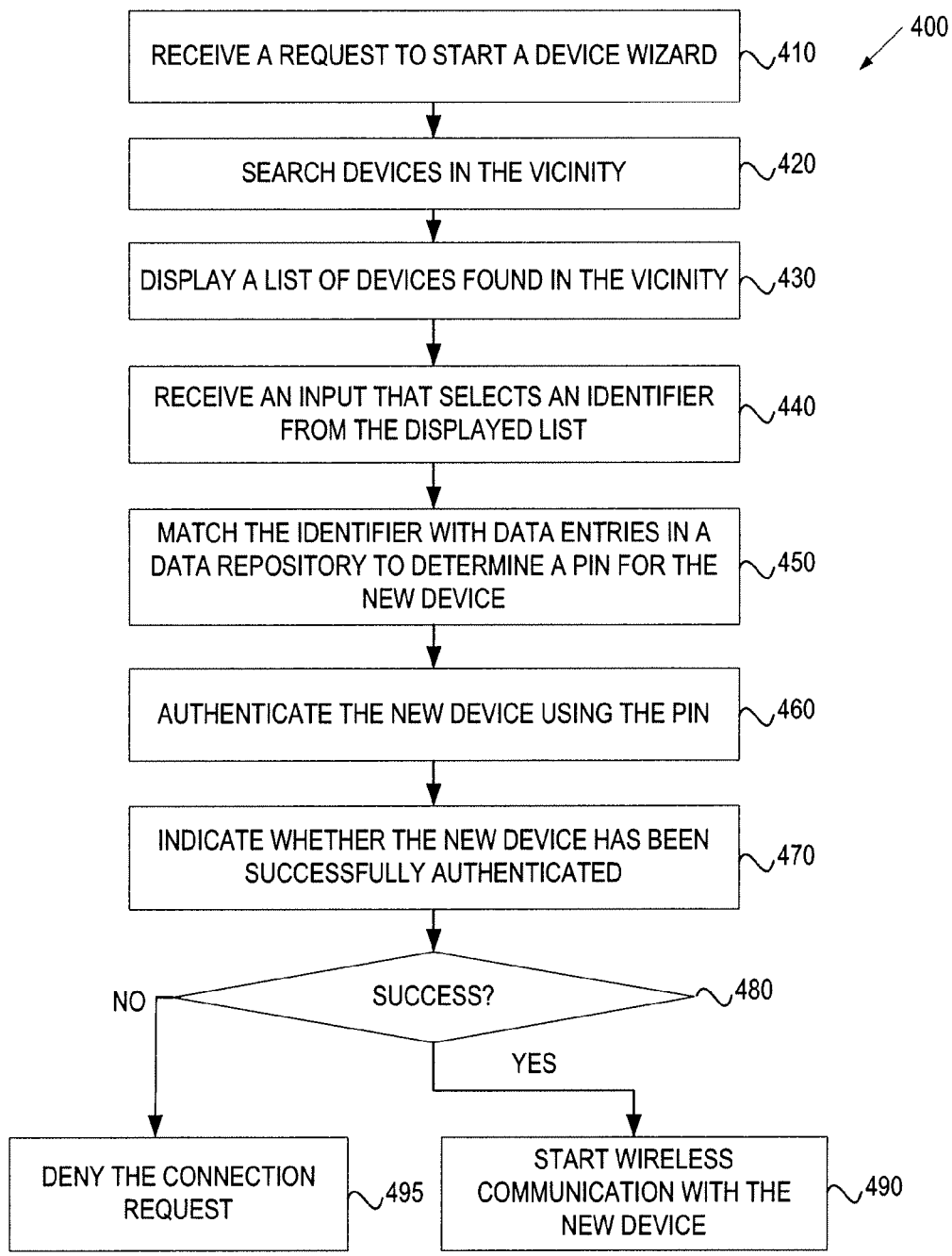
FIG. 4 is a flow diagram illustrating one embodiment of a method for device pairing.

FIG. 4 is a flow diagram illustrating one embodiment of a method 400 for pairing two wireless devices. The method 400 may be performed by computer system 500 of FIG. 5 that may comprise hardware (e.g., circuitry, dedicated logic, programmable logic, microcode, etc.), software (e.g., instructions run on a processing device to perform hardware simulation), or a combination thereof. In one embodiment, the method 400 is performed by the wireless device 100 of FIG. 1.

Referring to FIG. 4, in one embodiment, the method 400 begins when the wireless device 100 receives a request to activate the device wizard module 129 for adding a new connection to the wireless device 100 (block 410). The request may be in the form of a user launching the device wizard interface 128 on the display screen 127 of the wireless device 100. After the device wizard interface 128 is launched, the wireless device 100 searches the other wireless devices in the vicinity (block 420). The wireless device 100 may use one or more sensors 106 to detect the presence of the other wireless devices. These other wireless devices support the same wireless communication protocol as the wireless device 100. For short-range wireless communications, this protocol may be the Bluetooth protocol. The size of the vicinity within which wireless communication can be performed is defined by the Bluetooth protocol.

After the devices in the vicinity are found, the wireless device 100 displays a list of the devices on its display screen 127 (block 430). The list of devices shown on the display screen 127 may be filtered by the user to show only a specific type of the device. The user may select one of the listed devices as the new device to be connected. Through the device wizard interface 128, the device wizard module 129 receives an identifier (e.g., a device name and a device type) of the new device (block 440). The device wizard module 129 then matches the identifier with the data entries in the data repository 118 to determine the PIN code for the new device (block 450). After the PIN code is found, the network manager 107 uses the PIN code to authenticate the new device (block 460). The wireless device 100 may start a sequence of handshakes with the new device to exchange authenticating information. Upon completion of the handshakes, the wireless device 100 may display a message to indicate whether the new device has been successfully authenticated (block 470). If the new device has been successfully authenticated (block 480), the wireless device 100 can start wireless communication with the new device (block 490). If the new device cannot be authenticated (block 480), the wireless device 100 denies the request for connecting to the new device (block 495).

Figure 5:
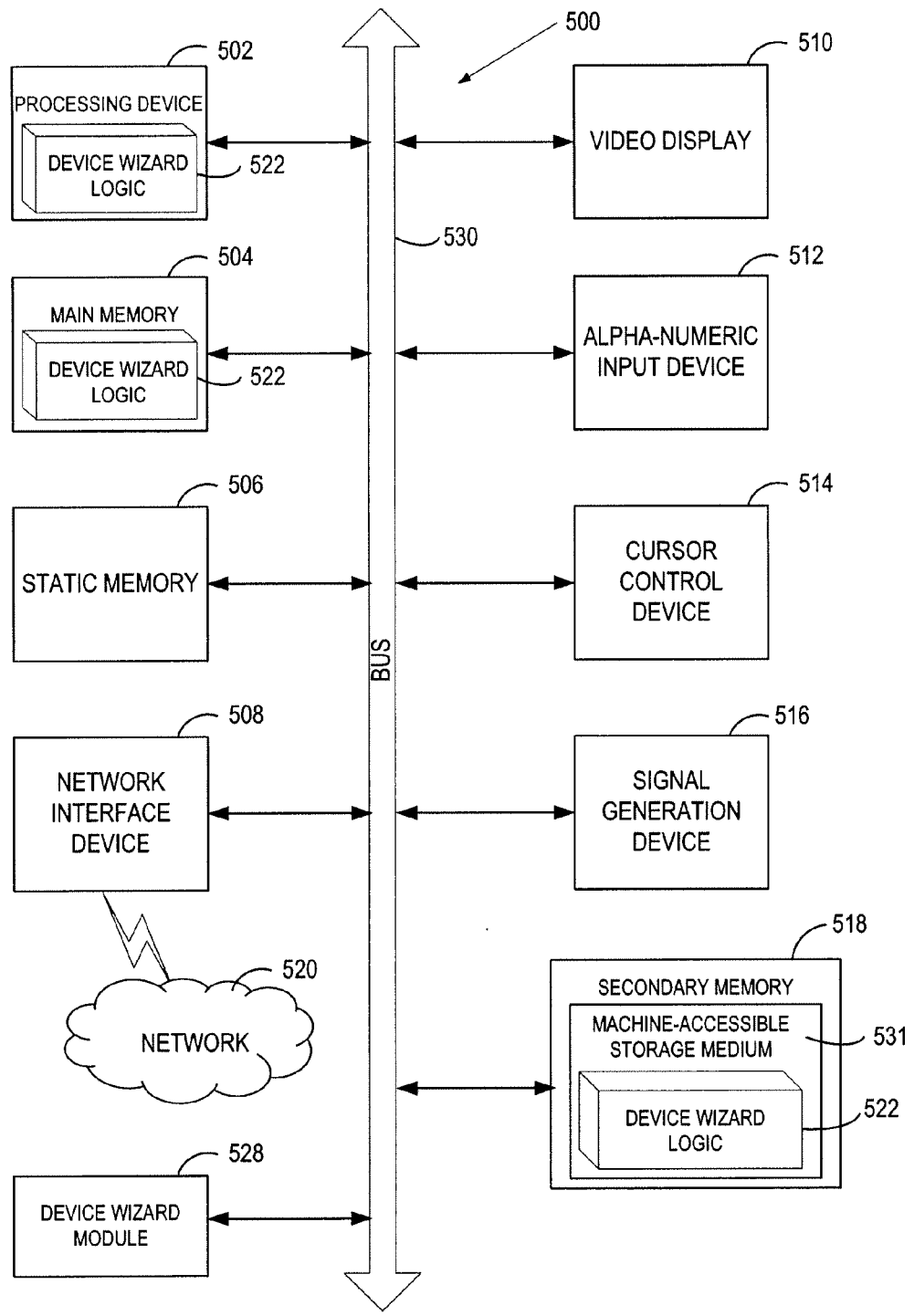
FIG. 5 illustrates a diagrammatic representation of a machine in the exemplary form of a wireless processing system.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a secondary memory 518 (e.g., a data storage device), which communicate with each other via a bus 530.

The processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 502 may also be one or more special-purpose processing devices such as an application specific integrated circuit (ASIC), a field programmable gate array (FPGA), a digital signal processor (DSP), network processor, or the like. The processing device 502 is configured to execute the device wizard logic 522 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The secondary memory 518 may include a machine-readable storage medium (or more specifically a computer-readable storage medium) 531 on which is stored one or more sets of instructions (e.g., device wizard logic 522) embodying any one or more of the methodologies or functions described herein (e.g., the device wizard module 129 of FIG. 1). The device wizard logic 522 may also reside, completely or at least partially, within the main memory 504 and/or within the processing device 502 during execution thereof by the computer system 500; the main memory 504 and the processing device 502 also constituting machine-readable storage media. The device wizard logic 522 may further be transmitted or received over a network 520 via the network interface device 508.

The machine-readable storage medium 531 may also be used to store the device wizard logic 522 persistently. While the machine-readable storage medium 531 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine that cause the machine to perform any one or more of the methodologies of the present invention. The term "machine-readable storage medium" shall accordingly be taken to include, but not be limited to, solid-state memories, and optical and magnetic media.

The computer system 500 may additionally include a device wizard module 528 for implementing the functionalities of the device wizard module 129 of FIG. 1. The module 528, components and other features described herein (for example in relation to FIG. 1) can be implemented as discrete hardware components or integrated in the functionality of hardware components such as ASICS, FPGAs, DSPs or similar devices. In addition, the module 528 can be implemented as firmware or functional circuitry within hardware devices. Further, the module 528 can be implemented in any combination of hardware devices and software components.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", "checking", "matching", "authenticating", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relates to an apparatus for performing the operations herein. This apparatus may be specially constructed for the required purposes, or it may comprise a general purpose computer system selectively programmed by a computer program stored in the computer system. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
   receiving a device identifier of a second wireless device that is to be connected to a first wireless device;
   checking a data repository comprising a plurality of data entries that associate a plurality of wireless devices with corresponding codes;
   matching, by a processing device, the device identifier with one of the plurality of data entries in the data repository, wherein each of the plurality of data entries comprise an organizationally unique identifier (OUI) and a device type, wherein the matching comprises applying a weighing factor to each of the plurality of data entries in view of the OUI and the device type, wherein the weighing factor is greater for the match of the device identifier with combination of the OUI and the device type than for the match of the device identifier with the device type;
   determining a code of the second wireless device in view of the match of the device identifier with one of the plurality of data entries; and
   authenticating the second wireless device in view of the code.

2. The method of claim 1, wherein a wireless connection is established between the first wireless device and the second wireless device using a Bluetooth protocol without support of Secure Simple Pairing (SSP).

3. The method of claim 1, further comprising:
   detecting, by the processing device, other wireless devices in a vicinity of the first wireless device, the second wireless device being one of the other wireless devices; and
   displaying a list of the other wireless devices detected in the vicinity on a display screen.

4. The method of claim 1, wherein the code is represented by one of a pre-determined fixed-length number or a random number having a maximum number of digits, or null.

5. The method of claim 1, wherein the matching the device identifier further comprises:
   scanning the data repository, in a direction from specific entries to generic entries, to determine a matching data entry for the second wireless device, wherein each of the specific entries comprises the OUI and each of the generic entries comprises the device type; and
   stopping scanning of the data repository when the matching data entry is found.

6. The method of claim 1, further comprising:
   detecting absence of an input device associated with the first wireless device;

searching for the input device in the vicinity; and
informing the user that a search is being performed for the input device.

7. The method of claim 1, further comprising:
providing a graphical user interface (GUI) to show a passkey option, the passkey option allowing a user to enter the code of the second wireless device when the code is not found in the data repository.

8. A non-transitory computer readable storage medium that provides instructions, which when executed by a processing device, cause the processing device, to perform operations comprising:
receiving a device identifier of a second wireless device that is to be connected to a first wireless device;
checking a data repository comprising a plurality of data entries that associate a plurality of wireless devices with corresponding codes;
matching, by the processing device, the device identifier with one of the plurality of data entries in the data repository, wherein each of the plurality of data entries comprise an organizationally unique identifier (OUI) and a device type, wherein the matching comprises applying a weighing factor to each of the plurality of data entries in view of the OUI and the device type, wherein the weighing factor is greater for the match of the device identifier with combination of the OUI and the device type than for the match of the device identifier with the device type;
determining a code of the second wireless device in view of the match of the device identifier with one of the plurality of data entries; and
authenticating the second wireless device in view of the code.

9. The non-transitory computer readable storage medium of claim 8, wherein a wireless connection is established between the first wireless device and the second wireless device using a Bluetooth protocol without support of Secure Simple Pairing (SSP).

10. The non-transitory computer readable storage medium of claim 8, the operations further comprising:
detecting, by the processing device, other wireless devices in a vicinity of the first wireless device, the second wireless device being one of the other wireless devices; and
displaying a list of the other wireless devices detected in the vicinity on a display screen.

11. The non-transitory computer readable storage medium of claim 8, wherein the matching the device identifier further comprises:
scanning the data repository, in a direction from specific entries to generic entries, to determine a matching data entry for the second wireless device, wherein each of the specific entries comprises the OUI and each of the generic entries comprises the device type; and
stopping scanning of the data repository when the matching data entry is found.

12. The non-transitory computer readable storage medium of claim 8, wherein the code is represented by one of a pre-determined fixed-length number or a random number having a maximum number of digits, or null.

13. The non-transitory computer readable storage medium of claim 8, the operations further comprising:
detecting absence of an input device associated with the first wireless device;
searching for the input device in a vicinity; and
informing a user that a search is being performed for the input device.

14. The non-transitory computer readable storage medium of claim 8, the operations further comprising:
providing a graphical user interface (GUI) to show a passkey option, the passkey option allowing a user to enter the code of the second wireless device when the code is not found in the data repository.

15. A system comprising:
a memory;
a processing device coupled to the memory, the processing device to:
receive a device identifier of a second wireless device to be connected to a first wireless device,
check a data repository comprising a plurality of data entries that associate a plurality of wireless devices with corresponding codes,
match the device identifier with one of the plurality of data entries in the data repository, wherein each of the plurality of data entries comprise an organizationally unique identifier (OUI) and a device type, wherein the match comprises apply a weighing factor to each of the plurality of data entries in view of the OUI and the device type, wherein the weighing factor is greater for the match of the device identifier with combination of the OUI and the device type than for the match of the device identifier with the device type,
determine a code of the second wireless device in view of the match of the device identifier with one of the plurality of data entries and
authenticate the second wireless device in view of the code.

16. The system of claim 15, wherein a wireless connection is established between the first wireless device and the second wireless device using a Bluetooth protocol without support of Secure Simple Pairing (SSP).

17. The system of claim 15, the processing device to:
detect other wireless devices in a vicinity of the first wireless device, and
display to show a list of the other wireless devices detected in the vicinity.

18. The system of claim 15 wherein the code is represented by one of a pre-determined fixed-length number or a random number having a maximum number of digits, or null.

19. The system of claim 15, the processor to:
detect absence of an input device associated with the first wireless device;
search for the input device in a vicinity; and
inform a user that a search is being performed for the input device.

20. The system of claim 15, the processor to:
provide a graphical user interface (GUI) to show a passkey option, the passkey option allowing a user to enter the code of the second wireless device when the code is not found in the data repository.

* * * * *